July 6, 1948.  H. J. HECHT  2,444,565

WELDING ELECTRODE HOLDER

Filed April 10, 1947

HERMAN J. HECHT.
INVENTOR

BY
Oltsch + Knoblock
ATTORNEYS

Patented July 6, 1948

2,444,565

UNITED STATES PATENT OFFICE 2,444,565

WELDING ELECTRODE HOLDER

Herman J. Hecht, South Bend, Ind.

Application April 10, 1947, Serial No. 740,553

6 Claims. (Cl. 219—8)

This invention relates to improvements in welding electrode holders.

The primary object of the invention is to provide a device of this character which is simple and sturdy in construction, easy to operate, readily and quickly assembled and disassembled, effectively electrically insulated to avoid danger of electrical shock to the operator, constructed from parts having low electrical resistance values to minimize generation of heat at any part except at the welding rod or electrode, and which is so constructed and heat insulated as to protect the user against offensive heat both from the transmission of electrical current therethrough and from the radiation of heat from the welding operation.

A further object is to provide a simple and effective holder for gripping a welding rod of any selected size firmly but detachably in either a perpendicular or an inclined or diagonal position, which device is readily operable to permit release of a spent electrode therefrom.

A further object is to provide a holder of this type having a tubular member terminating in a flared end within which a shaft having an enlarged apertured flared end is longitudinally slidable between a spring urged clamping position, in which the enlarged head of the shaft fits snugly against the flared tube end, and a projected position in which said shaft apertures are spaced clear of the flared end of the tube.

A further object is to provide an electrode holder of the type having a tube provided with a flared end and a shaft slidably and spring urged longitudinally within the tube and having an enlarged head provided with a diagonally extending aperture therethrough, wherein the diameter of the aperture at its inner end is larger than at its outer end so that welding electrodes of sizes substantially smaller than the maximum size which will be accommodated by the aperture may fit therein and be effectively clamped thereby.

Other objects will be apparent from the following specification.

Figure 1:
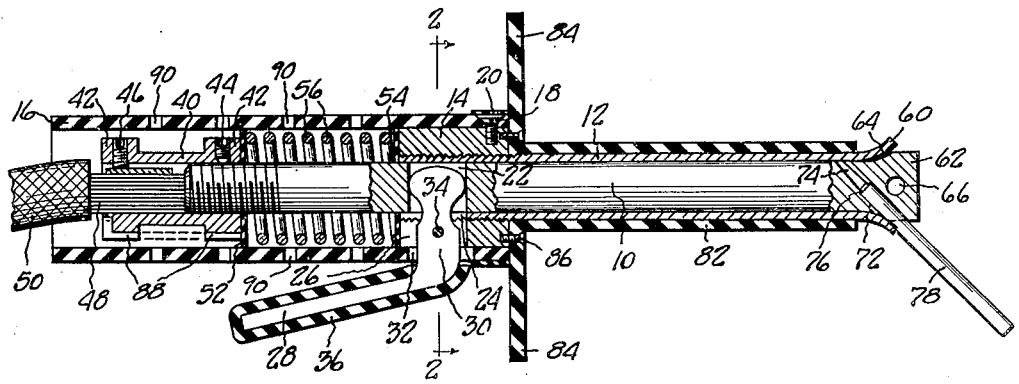
Fig. 1 is a longitudinal sectional view of the device taken on line 1—1 of Fig. 2.
Figure 2:
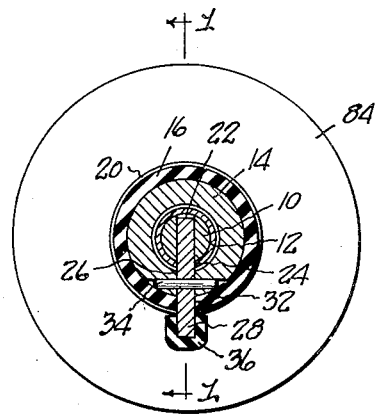
Fig. 2 is a transverse sectional view of the device taken on line 2—2 of Fig. 1.

Referring to the drawings which illustrate the preferred embodiment of the invention, the numeral 10 designates a conductor shaft formed of copper or other suitable material, which is of low electrical resistance and of comparatively large cross-sectional size. This shaft 10 fits slidably within a metal tube 12 at one end thereof. The tube 12 has a metal sleeve or collar 14 threaded thereon at its inner end. A tubular insulating handle or gripping member 16 is formed of fibrous material or other suitable insulating material. A plurality of circumferentially spaced screws 18 serve to rigidly secure and connect the forward end of the tubular handle 16 to the collar 14. The heads of the screws preferably terminate substantially flush with the tubular hand grip 16, and a rubber band 20 encircles the hand grip to cover the heads of the screws 18.

The shaft 10 is provided with a transverse slot 22 extending therethrough at the portion thereof encircled by the rear end of the tube 12 and by the sleeve 14. The rear end of the tube 12 has a slot 24 therein which registers and is aligned with the slot 22, and the sleeve 14 likewise has a slot 26 therein registering with the slots 22 and 24. An L-shaped trigger member having an elongated handle portion 28 and a shank portion 30 which projects through the aligned slots 22, 24 and 26, and through a slot 32 in the handle 16, is pivoted to the sleeve 14 by a pin 34. The end of the part 30 is of generally ovate configuration, as best shown in Fig. 1, with its major dimension approximately equal to the width of the slot 22, said head being defined in part by notches at the edges of the member 30 between the same and the pivot pin 34, as best seen in Fig. 1. A sheath 36 of rubber or other electrical insulating material encases the projecting handle portion 28 of the trigger member.

The shaft 10 projects inwardly within the handle sheath 16 beyond the inner end of the sleeve 14 and the tube 12 and is screw-threaded to mount a sleeve 40 at its end. The sleeve 40 is positioned within the confines of the tubular handle 16 and has a free sliding fit within the handle. As herein shown the sleeve is provided with circumferential enlargements 42 at its ends, and a set screw 44 is threaded in a radially tapped bore in the inner flange portion 42 and bears against the inner end of the shaft 10 to lock the sleeve 40 upon said shaft. The outer enlargement 42 has a similar set screw 46 threaded in a tapped radial opening and adapted to press against the bared lead wires 48 of a flexible electrical cable 50 which enters through the open outer end of the tubular handle 16. As herein shown the sleeve 40 is preferably formed of copper or other electrical conducting material having a low resistance value, and the bared portions 48 of the cable extend the full length of the sleeve from the rear end thereof to the end of the shaft 10 which is abutted thereby. An effective electrical connection is provided by the contact of the bared wires 48 with the sleeve at the side walls of the sleeve and also by direct contact in end abutment between the wires 48 and the shaft 10.

An insulating washer 52 bears against the inner end of the sleeve 40 and a similar insulating washer 54 bears against the inner faces of the sleeve 14 and the tube 12. A coil spring 56 encircles the shaft 10 and bears at its opposite ends against the washers 52 and 54. The coil spring normally urges the sleeve 40 and the shaft 10 to the left, as viewed in Fig. 1.

Figure 3:
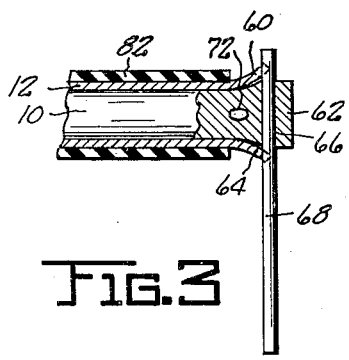
Fig. 3 is a fragmentary longitudinal sectional view of the device viewed at right angles to the position shown in Fig. 1.
Figure 4:
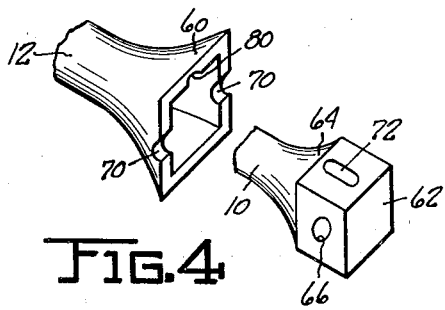
Fig. 4 is a fragmentary perspective view illustrating the construction of the parts which serve to clamp a welding electrode in the device.

The outer end of the tube 12 is flared at 60, as best shown in Fig. 4, said flared end portion 60 preferably being of square or rectangular cross-sectional shape, as shown in Fig. 4. The outer end of the shaft 10 is enlarged at 62 and is formed of a similarly squared or rectangular cross-sectional shape to the shape of the flared tube mouth 60. A flared shoulder 64 is formed on the shaft between its head 62 and the remainder thereof, said flared shoulder forming an abutment adapted to fit within the flared mouth 60 of the tube with a snug fit. The head 62 of the shaft has a cylindrical passage 66 extending transversely therethrough and located, as best seen in Fig. 3, with its axis positioned inwardly of the transverse plane defined by the tip of the tube 60 when the shaft shoulder 64 engages the flared mouth 60 of the tube. The passag 66 is of a diameter to receive the largest size of welding electrode 68 which is to be used with the device, the same being received with a free sliding fit. The flared mouth 60 of the tube 12 is notched at 70 in alignment with the opening 66, the notches 70 preferably being of a depth slightly less than the radius of the opening 66. The passage 66 and the notches 70 are so correlated and arranged that a welding electrode of the smallest size adapted to be used in the device will be effectively clamped and gripped by the cooperating shaft passage and tube mouth spring-pressed by the member 56, as shown in Fig. 3. In other words, the passage 66 and the notches 70 are so related that the electrode 68 will be clamped and engaged by said parts before the shoulder 64 abuts the flared mouth 60 of the tube incident to the inward movement of the shaft 10 under the influence of the spring 56.

Another passage is formed in the shaft head 62, being located in a plane extending longitudinally of said shaft which is perpendicular to the longitudinal plane of the shaft in which the passage 66 is positioned. This second passage 72 is inclined longitudinally and has an inner portion 74 of reduced size. The outer portion 72 is of a diameter to freely slidably receive the largest welding electrode which is to be used with the device, and the inner end 74 of the passage is of a lesser diameter and preferably slightly larger than the smallest diameter of welding electrode which is to be used in the device. The shoulder portion 76 between the passage portions 72 and 74 is preferably tapered. If desired the portion 74 may likewise be tapered, although the taper in this instance is very gradual as compared to a relatively abrupt taper at 76. The angle at which the passage 72, 74 extends is preferably approximately 45 degrees displaced from the axis of the shaft 10 and is at a slightly greater angle than the angular displacement of the flared end 60 of the tube 12. Consequently, when an electrode 78 is inserted in the passage 72, 74 the electrode will be engaged by the flared mouth 60 incident to the action of the spring 56, drawing the shaft 10 rearwardly. Electrodes of smaller size than the maximum which will fit within the portion 72 of the passage either extend into the smaller end 74 thereof or abut against the tapered shoulder 76 of the passage. In either instance the parts are so proportioned and arranged that such smaller electrodes will be similarly engaged and clamped by the pressure of the flared mouth 60 of the tube 12 thereagainst in the normal spring pressed position of the parts shown in Fig. 1. For this purpose the inner face of the flared tube portion 60 may be slightly grooved at 80 to form a socket limiting lateral play of the electrode.

A fibrous or other insulating tube 82 fits snugly around the portion 12 of the tube which projects outwardly from the sleeve 14, the said fiber tube terminating adjacent the flared tube mouth 60. An enlarged transversely extending shield or plate 84 of insulating material abuts against the outer face of the sleeve 14 between the tube 82 and the handle portion 16 and cooperates therewith to fully insulate the sleeve 14 and the tube 12 against accidental contact. The size of the plate 84 is sufficient to form a guard or shield to partly protect the hand of the user from heat generated incident to the welding operation and similarly to protect the hand of the user against sparks or brands flying from the workpiece incident to the welding operation. As shown in Fig. 1, parts 82 and 84 are formed integrally although it will be obvious that these parts may be formed separately. Small screws 86 may be used to secure the insulation member 84 to the end of the sleeve 14.

In the use of the device it will be apparent that the welding electrode may be mounted in either of two operative positions within the device. Thus in Fig. 1 is illustrated a mounting of the electrode 78 to project from the head of the holder at an angle of 45 degrees. In Fig. 3 the electrode 68 is illustrated as projecting perpendicularly from the holder. In either case the electrode is firmly gripped by the firm spring pressure of the head 62 of the shaft 10 and the mouth 60 of the tube 12 acting thereagainst. This firm pressure insures effective electrical connection between the electrode and the shaft 10 and also insures against free play or looseness of the electrode in the holder. At the same time the electrode may readily be released by simply pivoting the trigger handle 28 inwardly against the action of the spring 56 to project the shaft 10 outwardly so that its passages 60 and 72 are clear of the mouth 60 of the holder. The electrode by virtue of its free fit within the passage in which it is mounted may be disengaged and released either by gravity or by a slight shake, thus freeing the electrode from the holder and conditioning the holder for the introduction of a new electrode.

It is desirable where socket head screws are used upon the set screws 44 and 46 to provide a suitable tool for releasing the same so that the operator need not go to a tool box for such a tool. For this purpose the flange portions 42 of the sleeve 40 are preferably grooved at 88 to receive the shank of an L-shaped socket wrench shown in dotted lines in proper position in Fig. 1. Thus, when the device is disassembled by releasing the screws 18 which hold the handle tube 19 in place, that tube can be slid back over cable 50 to expose the sleeve 40 and release the tool retained within the grooves 88, whereupon said tool can be used to manipulate the set screws 44 and 46.

In order to dissipate any heat generated within the parts located within the tube handle 16 incident to the passage of current in the operation of the device, the handle 16 will preferably be provided with a plurality of ventilating openings 90 arranged therein properly for heat dissipation and at the same time to avoid weakening of the strength of the handle 16 objectionably.

Figure 5:
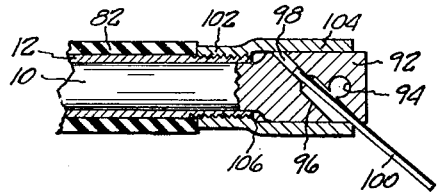
Fig. 5 is a fragmentary sectional view illustrating a modified embodiment of the invention.

Fig. 5 illustrates a modified embodiment of the invention wherein the conductor shaft 10 has an enlarged head 92 of substantial length within which are formed the transverse perpendicular electrode receiving passage 94 and the diagonal electrode receiving passage 96 having a reduced dimension inner end portion 98. An electrode 100 of a size smaller than the passage 98 is shown mounted in this device. The tube 12 which encircles the shaft 10 terminates short of the head 92 and is externally screw-threaded to removably mount the internally screw-threaded sleeve 102 upon an elongated socket 104 which is of a length substantially equal to the length of the head 92. The insulating sleeve 82 encircles the tube 12 and preferably abuts against the end of the sleeve 102. The head 92 and the socket 104 may be of any cross-sectional shape or configuration, such as square, circular, hexagonal, or the like, and preferably is non-circular.

The parts are so arranged that the throw of the shaft 10 will be sufficient to extend the shoulder 106 of the head 92 past the outer edge of the socket 104 so that the socket 104 may be rotated relative to the shaft 12 to facilitate separation and removal of the socket 104 from the tube. In some instances in welding, the heat of welding causes burning away of the socket 104, and in such cases the removable mounting of the socket 104 permits its ready replacement without necessitating discarding of the entire tube 12. In this form, if desired, the inner end of the tube 12 may have a circumferential enlargement similar to the sleeve 14 of the preferred embodiment formed integrally therewith. This embodiment possesses the same advantages as the preferred embodiment, and Fig. 5 illustrates the manner in which a rod or electrode 100 of substantially smaller size than the outer portion 96 of the inclined passage may be mounted fixedly within the same. Note that the inner end of the electrode 100 is held quite firmly and against substantial lateral play within the reduced part 98 of the passage, and that a notch, similar to the notch 80 illustrated in Fig. 4, may be provided in the socket 104 to prevent lateral play at the outer point of engagement or clamping action between the head 92 and the socket 104.

Any material found suitable may be used in this device. Thus the shaft 10 and the sleeve 40 will preferably be formed of copper or other material having good electrical conducting properties. The tube 12, the sleeve 14 and the handle 30 may be formed of any suitable metal, for which purpose a light weight metal, such as aluminum or magnesium, may be desirable to reduce the total weight of the unit. It will be noted that these parts do not form any necessary part of the conductor of electricity, and hence their electrical conducting properties are not critical.

While the preferred embodiment of the invention has been illustrated and described herein, it will be understood that the construction of the device may be altered within the scope of the appended claims without departing from the spirit of the invention.

I claim:

1. A welding electrode holder comprising a tube, a conductor shaft slidable within said tube, an insulating sheath enclosing the major portion of said tube and shaft and including a handle portion, a cable connector carried by said shaft, resilient means urging said shaft toward a clamping position, means for shifting said shaft against the action of said resilient means, said tube having a flared enlarged end projecting from said sheath, and an enlarged head on the end of said shaft having a pair of electrode passages extending transversely therethrough and at least partially spanned by said flared tube end when the inner end of said head abuts said tube end, said passages lying in angularly displaced planes and one of said passages extending diagonally relative to the axis of said shaft.

2. The construction defined in claim 1, wherein said diagonal passage has a reduced diameter inwardly tapered inner end portion defining an electrode abutment shoulder intermediate its ends.

3. A welding electrode holder comprising a tube, a conductor shaft slidable within said tube, an insulating sheath enclosing the major portion of said tube and shaft and including a handle portion, a cable connector carried by said shaft, resilient means urging said shaft toward a clamping position, means for shifting said shaft against the action of said resilient means, a head of enlarged cross-sectional size carried by the end of said shaft projecting from said sheath, the outer end of said tube being enlarged and fitting around said head, said head having a transverse electrode passage therein normally at least partly intersected by said tube and positioned clear of said tube end when said shifting means is actuated.

4. A welding electrode holder comprising a rigid elongated conductor having a head of enlarged cross-sectional size at one end, said head having angularly displaced passages extending transversely therethrough, a cable connector at the opposite end of said conductor, a tubular member encircling said conductor and having an enlarged end defining a socket receiving said head and adapted for edge abutment with an electrode mounted in one of said passages, an insulating sheath encasing said tubular member, conductor and connector and terminating short of said socket, resilient means urging said conductor in electrode clamping relation to said socket, and an insulated member projecting from said handle and actuable to shift said conductor head outwardly relative to said socket.

5. The construction defined in claim 4, wherein the inner end of said tubular member carries a circumferential enlargement, said enlargement mounting a handle-forming portion of said sheath and pivotally mounting said actuating member.

6. The construction defined in claim 4, wherein said tubular member has a circumferential enlargement at its inner end, said conductor, tubular enlargement and sheath having radially aligned slots, said actuating member constituting an L-shaped lever having an arm thereof fitting in said slots and pivoted to said enlargement.

HERMAN J. HECHT.

REFERENCES CITED

The following references are of record in the file of this patent:

UNITED STATES PATENTS

| Number | Name | Date |
|---|---|---|
| 1,240,901 | Symons | Sept. 25, 1917 |
| 1,928,517 | Varner | Sept. 26, 1933 |
| 2,232,213 | Churchward | Feb. 18, 1941 |
| 2,357,457 | Churchward | Sept. 5, 1944 |
| 2,411,329 | Mankowski | Nov. 19, 1946 |